May 30, 1933.  G. B. WATKINS  1,911,296
LAMINATED GLASS
Filed July 5, 1929
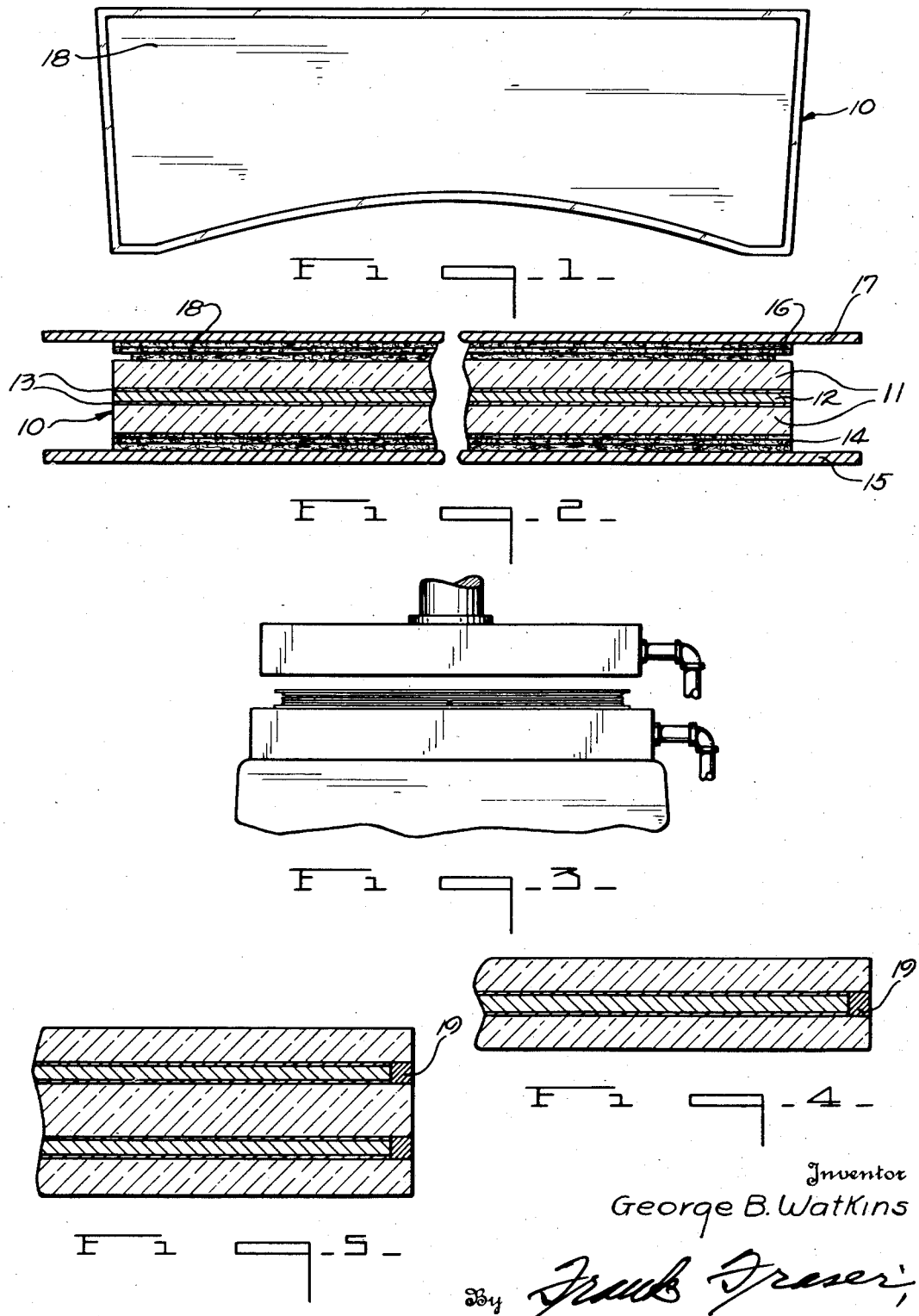
Inventor
George B. Watkins
By Frank Fraser
Attorney Patented May 30, 1933

1,911,296

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed July 5, 1929. Serial No. 375,896.

The present invention relates to a process for producing laminated glass.

In the manufacture of laminated glass, two or more sheets of glass and one or more non-brittle membranes are bonded together to produce what is generally called "non-shatterable" or "non-scatterable" glass. The value of such a sheet of glass is dependent to a considerable degree upon the character and permanency of the bond between the laminations. It is customary in obtaining this bond between the laminations to arrange the laminations, after they have been properly treated, in proper superimposed relationship to create a so-called "sandwich", which is subjected to the combined action of heat and pressure to bond the laminations together.

For various reasons, I have found it desirable to, in° effect, cushion the sandwich during the pressing operation, and I have accomplished this by the use of compressible means in the nature of blotting paper.

Some trouble has been experienced in the past by the formation or creation of small bubbles around the marginal portions of the finished laminated sheet during the pressing operation. Sometimes these bubbles will extend only a slight distance inwardly of the sheet from the border portions and can be removed when sealing the laminated glass. On the other hand, there are times when the bubbles extend inwardly of the sheet further than the normal depth of the seal.

I do not believe that the formation of these bubbles is the result of an improper method, use of materials, or apparatus, but attribute this trouble to the fact that the marginal portions of the pyroxylin plastic non-brittle sheet is relatively unconfined around the border portions of the sheet and is free to, in effect, become extruded from between the glass sheets. Ordinarily a relatively high pressure is exerted upon the sandwich, and due to the plastic nature of the pyroxylin sheet, the action of solvents, etc., the plastic does flow slightly and although slight, this flowing is sufficient to allow the formation of bubbles.

In accordance with the present invention, the sandwich is so treated during the pressing operation that pressure at the edges of the laminated sheet is relieved, thus preventing flowing of the plastic sheet at the edges where it has least resistance to flow and accordingly this prevents the pinching of the laminated sheet at the edge, reducing edge trains to a minimum and prevents the so-called flash back bubbles.

Other objects and advantages of the invention will become more apparent during the course of the following description, In the drawing wherein like numerals are employed to designate like parts throughout the same, Fig. 1 is a plan view of an improved type of cushioning means, Fig. 2 is a vertical transverse section through a sandwich ready for pressing and suitably cushioned, Fig. 3 is a diagrammatic representation of a pressing means, and Figs. 4 and 5 are fragmentary vertical sectional views of two types of finished product.

It will, of course, be appreciated that the present invention is in no way limited to any particular process of manufacturing a laminated sheet as regards the materials used. In other words, my improved cushioning means is applicable to any and all processes of laminated glass manufacture.

To more clearly illustrate the application of my invention, however, I will give an example of one method of making composite glass. The glass sheets, after being suitably cleaned, can be provided with skin coats, or not, as desired. The term "skin coat" is used to designate a deposit of some suitable plastic material such as a pyroxylin plastic upon one surface each of the glass sheets. After the skin coats have been properly dried, a pyroxylin plastic sheet is then treated with a suitable solvent, and likewise the skin coats can be so treated. After the application of the solvent which can be accomplished by dipping or spraying, the laminations are placed in proper superimposed relationship with the pyroxylin plastic non-brittle sheet between the glass sheets whereby to form a sandwich. Satisfactory glass can be made whether the skin coats are used or not. The sandwich is then placed in a press and subjected to the combined action of heat and pressure. Naturally the solvent acts upon the plastic material in a manner to obtain a bond. The type of bond, permanency of bond, etc. is, of course, dependent to a great extent upon the choice of materials.

Referring to Fig. 2, the numeral 10 designates a sandwich in its entirety, and as can be seen, the sandwich comprises two sheets of glass 11 and an interposed non-brittle membrane 12. The numeral 13 is used to designate a film of suitable solvent or the like, being shown in an exaggerated manner for the purposes of illustration.

As shown, three compressible sheets 14 are positioned beneath the sandwich 10, while a metallic member 15 is positioned to support the compressible sheets 14 and sandwich. The metallic plate 15 may be of aluminum or other suitable material. The compressible sheets 14 can be made from rubber, felt, or other material, although I have found the use of blotting paper to be entirely satisfactory and desirable from a cost standpoint. As shown, the compressible pads or sheets 14 are of the same size as the sandwich 10, but they can be larger if desired without in any way adversely affecting the success of the present invention.

Prior to my invention, the upper sheets or cushions 16 were made the same size as the sheets 14, namely, the same size as the sandwich or larger. The numeral 17 is used to designate a second metallic plate similar to the one 15. Particular attention is directed to Fig. 2 wherein it will be seen that the cushion 18, directly in contact with the sandwich 10, is of smaller dimensions than the sandwich. This is also clearly shown in Fig. 1. The cushion 18, which is the lowermost cushion of the upper series, is the only cushion or sheet that is of smaller size than the sandwich 10. Although the cushion in contact with the lower surface of the sandwich could be likewise smaller, nevertheless I have found in actual practice that the making smaller of a single sheet only, as shown in Figs. 1 and 2, is sufficient. It will be appreciated in Fig. 1 that the upper two cushions 16 have been removed so that the sandwich 10 and single cushion or mattress 18 is the only one illustrated.

From a practical standpoint, cutting of the cushion 18 exactly to undersize is not an expensive operation because ordinarily large quantities of glass of one size are produced so that a number of cushions can be cut at the same time. Also the same cushion can be used over and over again. In the art, the cushion 18 is usually referred to as a template and although the expression template is not particularly apt, nevertheless in view of its usage in the art, the expression template is to be used synonomously with the words cushion, compressible member, mattress, etc.

I have found that by making the template 18 approximately one-eighth of an inch smaller all around than the piece of glass, the bubbles above mentioned will not be formed. Of course, the template can be made larger or smaller than the figure just given. To properly hold the template in position centrally of the sheet, a few drops of oil or adhesive can be used. I have used both and found that the template when held in position by means of oil or an adhesive will not slip so that a uniform margin will be presented around the entire sandwich during the pressing operation. Mechanical spacers or lining-up devices are, of course, contemplated by the present invention.

It has been found that the use of a cushion or template undersized as above explained serves to relieve the pressure at the edges of the laminated sheet, thus preventing the flowing of the plastic at the edges where it has least resistance to flow, and accordingly this prevents the pinching of the laminated sheet at the edges and reduces edge strains to a minimum, thus preventing so-called flash back bubbles. It is to be pointed out that the use of a smaller template than the sandwich overcomes or prevents the formation of bubbles around the margins of the sheet, but on the other hand in no way adversely affects the general bond between the laminations throughout their entire area.

It will also be appreciated that the cushions in Fig. 1 have not been drawn to accurate size and that ordinarily sheets of blotting paper of less thickness than those illustrated are used, although there are no limits within reason as to the thickness of cushioning means that can be employed.

Figs. 4 and 5 illustrate two types of glass and in each case the sheets of glass have been provided with a seal 19.

I claim:

1. The process of producing laminated glass, consisting in arranging suitably treated laminations in proper superimposed relationship, the inner lamination being of a size at least as large as the outer laminations, and then pressing the sandwich thus formed to produce a composite sheet, the pressure exerted on the sandwich including the non-brittle material being uniform throughout its area except around the marginal portions where relatively less pressure is applied.

2. The process of producing laminated glass, consisting in arranging suitably treated laminations in proper superimposed relationship, the inner laminations being of a size at least as large as the outer laminations, then placing the sandwich thus formed between cushioning means, and then pressing the sandwich to produce a composite sheet, the marginal portions of the sandwich including the non-brittle material being subjected to less pressure than the balance thereof and the remainder of the sheet being subjected to substantially equal pressure.

Signed at Toledo, in the county of Lucas and State of Ohio, this 1st day of July 1929.

GEORGE B. WATKINS.